No. 670,178. Patented Mar. 19, 1901.
E. G. LATTA.
VELOCIPEDE CRANK FASTENING.
(Application filed June 19, 1899.)
(No Model.)
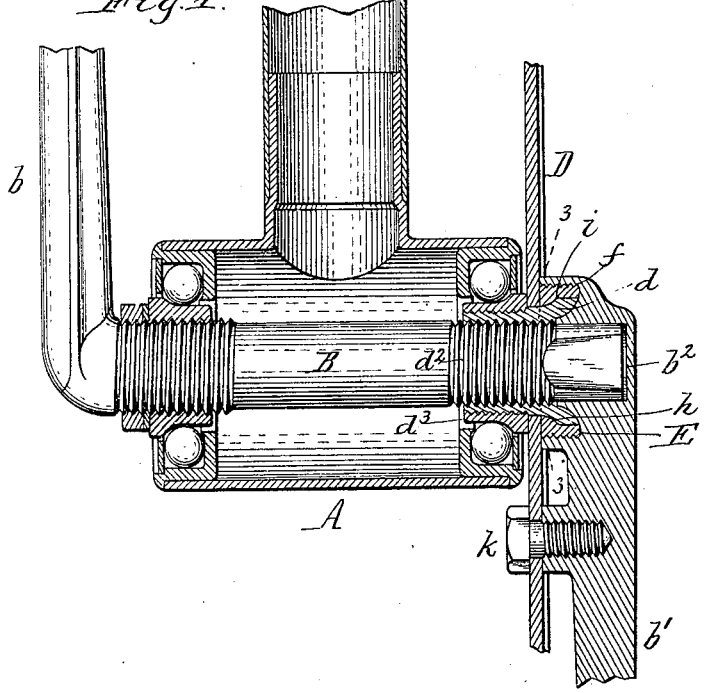
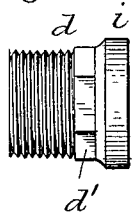
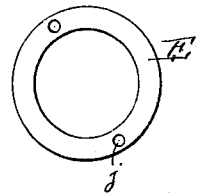
Witnesses:
Henry L. Deck.
F. F. Schuyzinger
Emmit G. Latta, Inventor.
By Wilhelm Bonner
Attorneys.
THE NORRIS PETERS CO., PHOTO-LITHO., WASHINGTON, D. C.

UNITED STATES PATENT OFFICE.

EMMIT G. LATTA, OF FRIENDSHIP, NEW YORK.

VELOCIPEDE CRANK-FASTENING.

SPECIFICATION forming part of Letters Patent No. 670,178, dated March 19, 1901.

Application filed June 19, 1899. Serial No. 721,105. (No model.)

*To all whom it may concern:*

Be it known that I, EMMIT G. LATTA, a citizen of the United States, residing at Friendship, in the county of Allegany and State of New York, have invented new and useful Improvements in Velocipede Crank-Fastenings, of which the following is a specification.

This invention relates to the fastening or connection between the crank-shaft and the detachable crank and the sprocket-wheel.

The object of my invention is to provide a simple, strong, smooth, and compact fastening for these parts which permits the same to be readily assembled and dismembered.

In the accompanying drawings, Figure 1 is a sectional elevation of a crank-shaft and adjacent parts provided with my improvement. Fig. 2 is a detached side elevation of the sprocket-wheel hub. Fig. 3 is a transverse vertical section in line 3 3, Fig. 1. Fig. 4 is a detached face view of the connecting-ring.

Like letters of reference refer to like parts in the several figures.

A is the crank-hanger, of any ordinary construction, and B the crank-shaft, journaled in the same by ball-bearings of any suitable or well-known construction and having an integral or permanent crank $b$ and a detachable crank $b'$. The end of the shaft to which the detachable crank is applied is flattened and preferably tapered, and the boss of said crank is provided with a correspondingly-shaped socket or opening $b^2$, which receives the end of the shaft.

D is the body of the sprocket or driving wheel, and $d$ its hub, which is separate from the body and provided with an angular portion $d'$ of hexagonal or other suitable form, which fits into a correspondingly-shaped opening in the center of the sprocket-wheel, as shown in Fig. 3, whereby the hub and the sprocket-wheel are compelled to turn together. The hub engages with the crankshaft by a screw-thread $d^2$. The body of the sprocket-wheel is held against inward displacement on its hub by a nut $d^3$, applied to the externally-screw-threaded inner portion of the hub and bearing against the inner side of the sprocket-wheel.

E is a ring which connects the boss of the detachable crank with the hub of the sprocket-wheel. This connecting-ring is removably seated in a socket $f$, formed in the inner side of the crank-boss, the ring being preferably provided with an external screw-thread which engages with an internal thread of said socket, as shown. The connecting-ring is provided at its inner end with an inwardly-projecting annular lip or flange $h$, which overlaps or interlocks with an outwardly-projecting annular flange $i$, formed at the outer end of the hub $d$, so that the hub while being interlocked with the crank is capable of turning in the connecting-ring. The ring is provided in its outer face with a pair of openings $j$, adapted to receive a pin-wrench for turning the ring. By this construction the ring is concealed in the socket of the detachable crank, and the body of the sprocket-wheel is confined between the socketed crank-boss and the clamping-nut $d^3$. In the construction shown in the drawings this nut serves also as the cone of the right-hand bearing.

$k$ is the usual bolt or stud, which connects the detachable crank with the sprocket-wheel and prevents the latter from unscrewing when in use.

In assembling the parts the connecting-ring E is first passed over the reduced inner portion of the hub $d$, so that its flange $h$ bears against the flange $i$ of the hub, and the ring is then tightly screwed into the socket $f$ of the detachable crank, thereby confining the connecting-ring on the hub and practically journaling the hub in the crank-boss. The sprocket-wheel is then passed over the reduced portion of the hub and clamped against the crank-boss by the screw-nut $d^3$. After placing the shaft in the hanger the hub is passed over the end of the shaft and screwed upon the same by means of the sprocket-wheel until the tapering flat-sided socket $b^2$ of the detachable crank is firmly drawn upon the end of the shaft. After thus applying the parts to the shaft the sprocket-wheel and the crank are connected by the bolt $k$.

To remove the detachable crank, the bolt $k$ is removed and the hub is simply unscrewed from the shaft by means of the sprocket-wheel. After removing the parts from the shaft the sprocket-wheel can be detached from its hub by removing the clamping-nut $d^3$, and the removable crank can be detached from the hub by unscrewing the connecting-ring E from the socket of said crank.

I claim as my invention—

1. The combination with a crank-shaft having an angular end and a screw-thread adjacent to its end, of a detachable crank having an opening which fits the angular end of the shaft and provided in the inner side of its boss with a socket, a driving-wheel hub having an internal screw-thread engaging with the screw-thread of the shaft and provided with an annular flange, and a connecting-ring movably secured in the socket of said crank and provided with an annular flange which interlocks with the flange of said hub, substantially as set forth.

2. The combination with a crank-shaft having an angular end and a screw-thread adjacent to its end, of a detachable crank having an opening which fits the angular end of the shaft and provided in the inner side of its boss with a screw-threaded socket, a driving-wheel having an internal screw-thread engaging with the screw-thread of the shaft and provided at its outer end with an outwardly-projecting annular flange, an externally-screw-threaded connecting-ring engaging in the screw-threaded socket of said crank and provided at its inner end with an inwardly-projecting annular flange which overlaps the flange of said wheel-hub, a sprocket-wheel body removably mounted on said hub and held against turning thereon and bearing at its outer side against said crank-boss, and a clamping-nut applied to said hub and bearing against the inner side of the sprocket-wheel body, substantially as set forth.

Witness my hand this 13th day of June, 1899.

EMMIT G. LATTA.

Witnesses:
JNO. J. BONNER,
ELLA R. DEAN.